INVENTOR
WILLIAM T. BROOKS

INVENTOR
WILLIAM T. BROOKS

BY Howard W. Hermann

ATTORNEY

United States Patent Office 3,606,463
Patented Sept. 20, 1971

3,606,463
VEHICULAR SEATING SYSTEM USING BOUNCING PUTTY
William Thomas Brooks, Midland, Mich., assignor to Dow Corning Corporation, Midland, Mich.
Filed May 21, 1969, Ser. No. 826,561
Int. Cl. A47c 27/20; B60n 1/06
U.S. Cl. 297—455        6 Claims

ABSTRACT OF THE DISCLOSURE

A vehicular seating system which comprises a rigid backing member supporting a cellular cushion of elastomeric material having a plurality of voids extending through the cushion, the voids being filled with silicone bouncing putty resiliently confined by the elastomer. The system is suitable for both land vehicles and aircraft and serves to limit injuries.

BACKGROUND OF THE INVENTION

The present invention relates to vehicular seating systems for automobiles, aircraft and similar vehicles, and more particularly relates to constructions for providing safety to the occupants of such vehicle seats in the event of accelerations caused by collision or, in the case of aircraft, ejection.

It has in the past been a common practice in vehicular seating arrangements to provide cushioning for comfort of the seat occupant. Generally this cushioning has been made up of resilient polymeric foams or spring-biased pads of various types. In recent studies of injuries caused in automotive crashes and in aircraft ejections, it has been found that there is a high incidence of spinal injury, part of which is attributable to the seat construction.

In aircraft, for example, the seat occupant is stationary with respect to the seat at the time an explosive charge is fired to eject the seat from the airplane cockpit. As the seat begins to accelerate, the seat occupant momentarily remains at rest while the cushioning material absorbs the initial motion. Once the elastomeric cushioning material has been completely compressed, the seat occupant is subjetced to substantially greater acceleration than the seat itself in order for the occupant to achieve the velocity already gained by the seat. This added acceleration provides a substantially greater strain on the spinal column of the seat occupant, and in many cases causes spinal fracture.

When an automobile is involved in a collision, any resilient cushioning also aggravates the accelerative forces applied to the seat occupant. In a head-on collision, for example, the occupant is thrown forward, not just by his own inertia, but also by the decompressive forces of the seat cushioning. In the case of a rear-end collision, the seat back tends to whip to the rear adding to the forces inherent in the springiness of the cushion in causing accelerations. This is believed to be a major cause of the so-called "whiplash" injuries.

It has been suggested that the seat occupant should be held tightly against a rigid seat bottom and back. A rigid seat, however, is extremely uncomfortable for any extended period of time. Most of the occupant's weight is concentrated on the area in close proximity to the pelvic bones of the seat occupant. Concentration of the weight of the occupant on these small areas can become extremely uncomfortable.

While contour seating—that is, the structure conforming closely to the body contours of the seat occupant—can serve to provide a more even weight distribution over a large area, it is seldom that a contour seat can be made to fit the body contours of more than a few people. The reason that resilient cushioning is attractive is because it is readily adaptable to any body contour, thus providing even weight distribution and elimination of pressure points. Since it is impractical to provide seats molded to the exact body contours of each individual, such cushioning has therefore been looked upon as the ultimate solution. Cushioning, of course, has a comfort advantage in conforming as the occupant shifts position. From the safety aspects as pointed out above, however, this solution is dangerous.

In U.S. Pat. No. 3,382,511, there is described a safety cushion for an aircraft ejection seat, which cushion consists primarily of a quantity of silicone bouncing putty contained within rigid sidewalls. The silicone bouncing putty is a viscosity-dilatent material and is described in detail, for example, in U.S. Pat. No. 2,541,851. These materials have the unique property that they are subject to flow under pressure, but under sudden forces, the viscosity increases to the point where the material becomes rigid.

Thus, the seat occupant, in effect, custom molds the dilatent material to his own body contours and achieves an even weight distribution. The rigid sidewalls and rigid bottom of the cushion of the aforesaid patent prevent the material from completely flowing from beneath the seat occupant. In the event of suddenly applied loads, such as during ejection, the material rigidifies and allows virtually no movement of the occupant relative to the seat.

The volume of the material to fill the cushion of the aforesaid patent is substantial and due to the relatively high price of the material makes the cost of the cushion quite expensive. Additionally, the rigid sidewalls which contain the material tend to be uncomfortable to the occupant.

SUMMARY OF THE INVENTION

Accordingly, the primary object of the present invention is to provide an improved vehicular seating system which eliminates the disadvantages and problems inherent in the prior art.

In accordance with this and other objects, there is provided by the present invention a cushion utilizing the general characteristics of that disclosed in U.S. Pat. No. 3,382,511, but providing a more economical and more comfortable arrangement. In its simplest form, the system comprises a rigid backing member supported in space, a cellular cushion of elastomeric material supported by the rigid backing member, a plurality of voids extending through the cellular cushion and a quantity of flowable viscosity-dilatent material filling the voids. The system is suitable both in aircraft and in land vehicles and can be used not only in seat bottoms but seat backs as well.

The cellular material of the cushion serves to prevent the dilatant material from leaving the void in which it is placed and yet allows the material to be flattened out under the weight of the seat occupant. Additionally, when the occupant leaves the seat, the resiliency of the cellular material gradually causes the dilatant material to flow back into its original shape; whereupon the cushion, as a whole, regains its original configuration. The seat is, therefore, more comfortable to the next occupant in that no appreciable ridges or other deformities are present at the time the new occupant sits down. Further, there is no necessity for a rigid sidewall, which can cut into the thighs of the user. The flattening of the dilatent material in use acts to restrain the foam from any catapulting effect in the event of accelerations.

Other objects, advantages and novel features of the present invention will become apparent from the following detailed description of the invention when considered in conjunction with the accompanying drawings.

DESCRIPTION OF THE PREFERRED EMBODIMENTS

Figure 1:
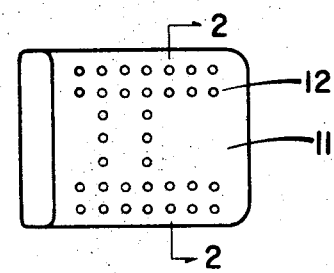
FIG. 1 is a top view of a seat cushion made in accordance with the present invention.

Referring now to the drawings wherein like reference characters designate like or corresponding parts throughout the figures, there is shown in FIG. 1 a top view of a seat bottom comprising a cellular cushion 11 of elastomeric material such as sponge rubber having a plurality of voids 12 located therein. The voids 12 are positioned in greater concentration in those areas of the cushion which will normally be in the proximity of the pelvic bones of the seat occupant when the seat is occupied than in the remaining areas of the cushion. In a preferred embodiment, the voids are formed by punching cylindrical holes having about one-half inch diameter in a cushion about one inch in thickness.

Figure 2:
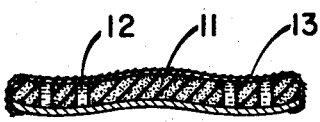
FIG. 2 is a cross-sectional view of the cushion of FIG. 1 taken on the line of 2—2 of FIG. 1 and showing a more detailed construction thereof.

As may be seen more clearly from FIG. 2, the voids 12 are filled with flowable viscosity-dilatent material such as silicone bouncing putty. It has been found that this material is easily confined by conventional foamed elastomers, regardless of whether the foam is of the open cell or closed cell type.

In order to protect the clothing of the seat occupant, it is preferred that protective layer 13 be provided at least over the dilatent material and the voids and preferably over the entire cushion. By making the protective layer of a polymeric film of material which is impervious to the dilatent material, there is no danger of flow of the material onto the clothing of the occupant. Suitable fabric coverings can also be provided. Under the cellular cushion 11 there is placed a rigid backing member 14; for example, of metal or rigid plastic, to provide support for the cushion and its occupant. In order to provide additional comfort to the occupant, the rigid backing may be preshaped to conform generally to the shape of the human buttocks.

In use as the occupant is seated upon the cushion, the cellular material crushes under the weight of the occupant and the dilatent material gradually flows to conform to the shape of the buttocks of the occupant and provides substantially uniform support. In the event of sudden accelerations such as collision or ejection from an aircraft, the dilatent material solidifies and prevents relative movement by the occupant and the seat.

Figure 3A:
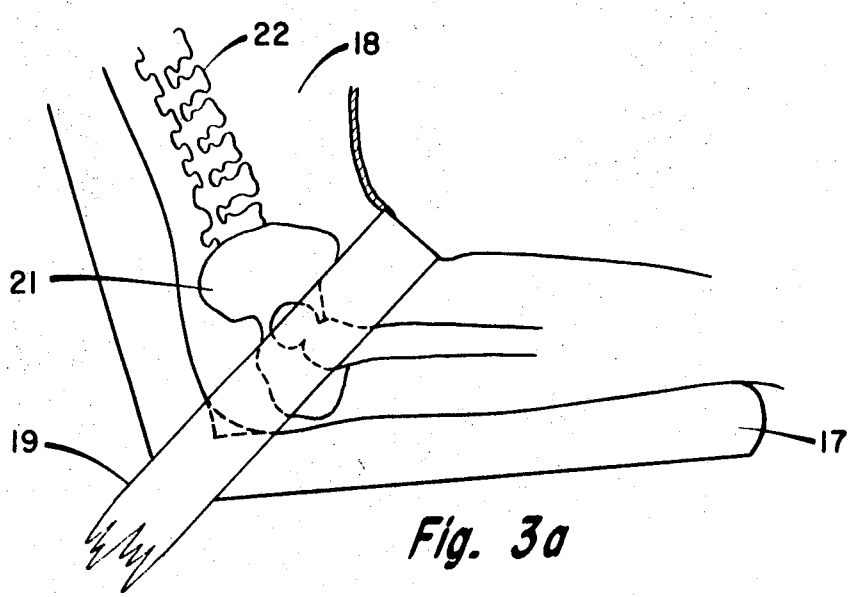
FIG. 3(a) is a schematic drawing indicating the position of a seat occupant in a conventional seat in normal position.
Figure 4A:
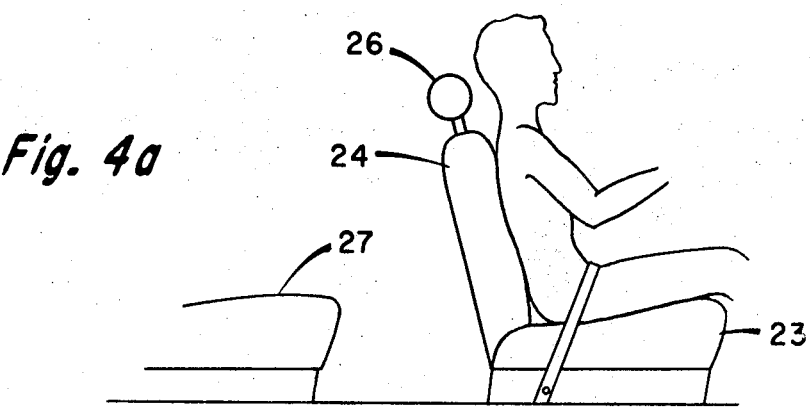
FIG. 4(a) is a schematic drawing indicating the position of a seat occupant in a conventional seat prior to rear-end collision.

The reasons for providing substantial rigidity can be seen more clearly from FIGS. 3(a) and (b) and FIGS. 4(a) and (b).

In FIG. 3(a) there is shown a conventional seat bottom and back comprising a rigid frame having a resilient layer 17 positioned thereover. A seat occupant 18 is shown in a normal seating position constrained by the use of the safety belt 19. The position of the pelvis 21 of the occupant is shown in its normal position.

Figure 3B:
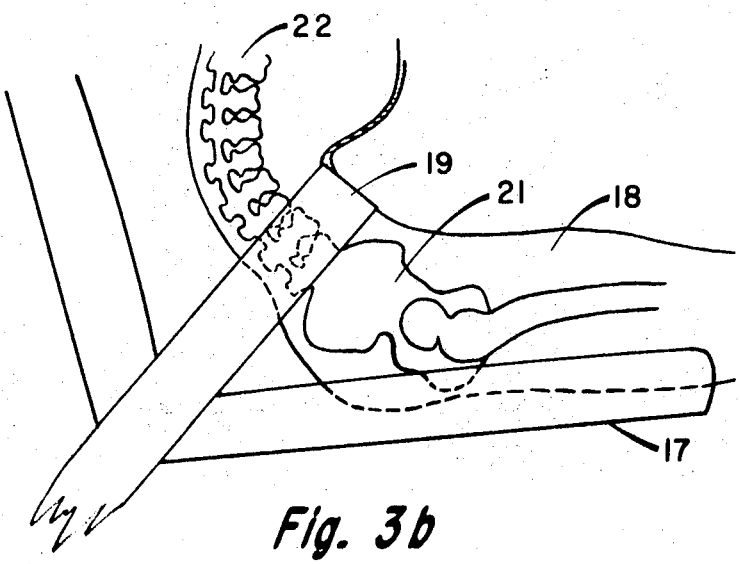
FIG. 3(b) is a schematic drawing similar to FIG. 3(a) showing the position of the cushion and occupant in the event of a head-on collision.

Referring now to FIG. 3(b), there is shown the position of the occupant upon a front-end impact such as a head-on collision. The occupant 18 has been subjected to severe acceleration in the forward direction by the resilient material 17 in the seat back. Additionally, due to the vehicle forces exerted on the occupant, there has been a "submarining" of the occupant under the restraining belt 19 causing severe compression of the abdomen of the occupant and substantial curvature of the spinal column 22. Under such circumstances, there is substantial danger of abdominal injuries as well as danger to the spinal column.

Figure 4B:
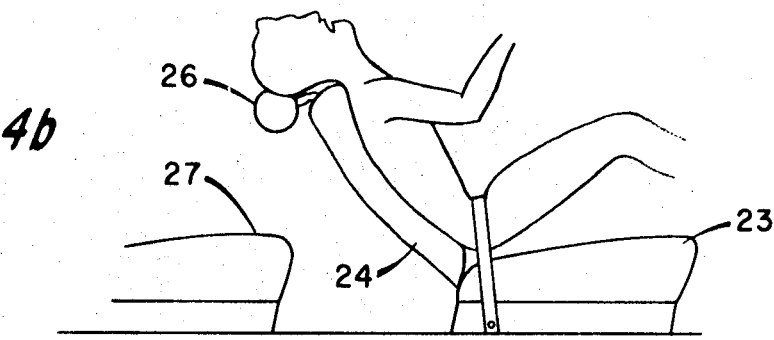
FIG. 4(b) is a view similar to FIG. 4(a) indicating the position of seat and occupant upon rear-end collision.

The figure shown in FIG. 4(a) is seated in normal position in an automobile seat having a bottom cushion 23, a back cushion 24 and a head rest 26. As is shown in FIG. 4(b) upon rear-end collision, the seat back 24 and head rest 26 are whipped backward by the accelerative forces and the occupant is thrown to the rear compressing the resilient cushioning in the back 24. Under such circumstances, the head rest 26 is often broken, and the seat back 24 may actually reach the rear seat 27. Upon recovery of the seat back 24 and its resilient filling, the seat occupant is again whipped forward, subjecting the spinal column of the occupant to whiplash.

Figure 5:
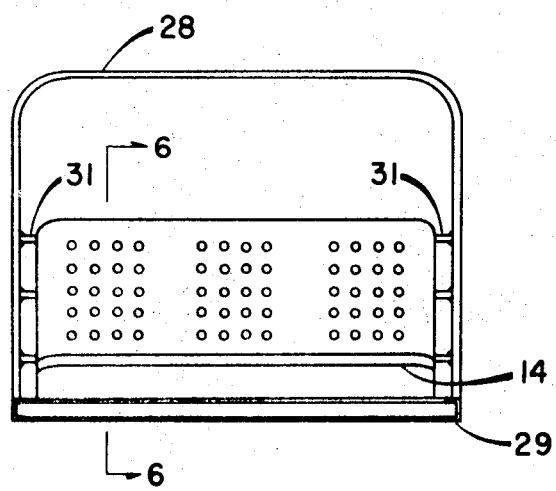
FIG. 5 is a front view of an attachment system for a seat in a motor vehicle according to the present invention.
Figure 6:
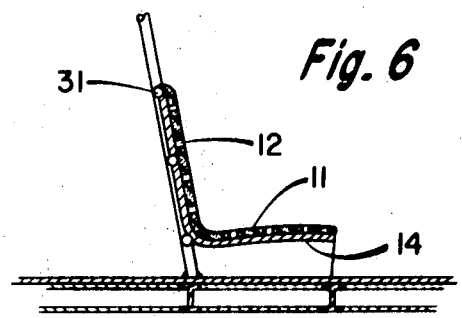
FIG. 6 is a cross-sectional view taken along the line 6—6 of FIG. 5 showing the attachment system in greater detail.

By providing as seat cushions in both the bottom and back structures such as that shown in FIGS. 1 and 2, the problems inherent in compression and decompression of the resilient material are substantially eliminated. In order to prevent the whiplash effects of the seat back, an arrangement such as that shown in FIGS. 5 and 6 is preferred to rigidly support the backing member of the seat in place. The rigid backing member 14 and cushion 11 lie generally in two intersecting planes; one substantially vertical and the other substantially horizontal, thereby forming both seat and back and seat bottom. As shown in these figures, a rigid framework 28 attached to the frame 29 of the vehicle is provided completely around the seat in substantially parallel relationship therewith. A plurality of reinforcing bars are welded to the framework 28 and extend horizontally through the seat back. The framework 28 may be similar, for example, to the well known automotive roll bar. By virtue of the rigid framework, the whipping action of the seat back is eliminated, and danger of the seat tearing loose upon impact is minimized. The substantially rigid cushion eliminates any cushion-caused accelerative forces as described hereinabove.

From the above description of preferred embodiments, other modifications and variations will become apparent to those skilled in the art. Accordingly, the invention may be practiced other than as specifically described.

That which is claimed is:

1. In a vehicular seating system comprising in combination a rigid backing member, a cellular cushion of elastomeric material supported by said rigid backing member and having a plurality of voids extending at least substantially therethrough, and a protective layer covering said voids, the improvement which further comprises:

flowable silicone bouncing putty filling said voids and resiliently contained in said voids by said elastomeric material;

whereby the original configuration of said seating system is maintained by the elasticity of said cellular cushion and said seating system is rendered substantially rigid, during sudden accelerations, by the viscosity-dilatent property of said silicone bouncing putty.

2. A seating system as defined in claim 1 wherein said protective layer includes polymeric filler substantially impermeable to said putty.

3. A seating system as defined in claim 2 wherein said protective layer further includes a fabric cover over said cushion.

4. A seating system as defined in claim 1 wherein said voids are placed only in those areas of said cushion which would normally be in the proximity of the pelvic bones of the seat occupant when said seat is occupied.

5. A seating system as defined in claim 1 wherein a greater concentration of said voids are placed in those areas of said cushion which would normally be in the proximity of the pelvic bones of the seat occupant when said seat is occupied than in the remaining areas of said cushion.

6. A seating system as defined in claim 1 wherein said rigid backing member and said cushion both lie generally in two intersecting planes; one substantially vertical and the other substantially horizontal, thereby forming both seat back and bottom of similar construction.

References Cited

UNITED STATES PATENTS

| | | | |
|---|---|---|---|
| 2,127,710 | 8/1938 | Baker | 297—457 |
| 2,946,374 | 7/1960 | Dickey | 297—456 |
| 3,308,491 | 3/1967 | Spence | 5—355X |
| 3,355,211 | 11/1967 | Kolle | 296—65 |
| 3,382,511 | 5/1968 | Brooks | 5—355 |
| 3,401,411 | 9/1968 | Morrison | 5—355X |
| 3,476,435 | 11/1969 | Hitzelberger | 296—65 |

CASMIR A. NUNBERG, Primary Examiner

U.S. Cl. X.R.

5—355